(12) United States Patent  
Wagner et al.

(10) Patent No.: US 7,621,508 B2
(45) Date of Patent: Nov. 24, 2009

(54) METHOD AND DEVICE FOR STORING A TRACTION CHAIN

(75) Inventors: Alexander Wagner, Lohra (DE); Ralf Battenberg, Fronhausen (DE)

(73) Assignee: Motus Engineering GmbH & Co. KG, Fronhausen (DE)

( * ) Notice: Subject to any disclaimer, the term of this patent is extended or adjusted under 35 U.S.C. 154(b) by 537 days.

(21) Appl. No.: 11/113,687

(22) Filed: Apr. 25, 2005

(65) Prior Publication Data

US 2005/0242228 A1 Nov. 3, 2005

(30) Foreign Application Priority Data

Apr. 26, 2004 (DE) ................... 20 2004 006 624 U

(51) Int. Cl.
*B66D 1/30* (2006.01)
(52) U.S. Cl. ...................................... 254/372; 254/383
(58) Field of Classification Search ................. 254/372, 254/382, 383; 220/83; 206/409
See application file for complete search history.

(56) References Cited

U.S. PATENT DOCUMENTS

| | | | | |
|---|---|---|---|---|
| 4,227,677 A | * | 10/1980 | Bernaerts | 254/264 |
| 5,277,407 A | * | 1/1994 | Mayne et al. | 254/369 |
| 5,556,077 A | * | 9/1996 | Braesch et al. | 254/267 |
| 5,605,038 A | * | 2/1997 | Rozenwasser | 59/35.1 |
| 5,737,910 A | * | 4/1998 | Rozenwasser | 59/35.1 |
| 5,970,701 A | * | 10/1999 | Roden et al. | 59/78 |
| 6,811,112 B1 | * | 11/2004 | Currie et al. | 242/534.1 |
| 6,823,991 B2 | * | 11/2004 | Breyer et al. | 206/348 |
| 7,080,824 B1 | * | 7/2006 | George et al. | 254/267 |
| 7,340,878 B2 | * | 3/2008 | Rozenvasser et al. | 59/35.1 |

FOREIGN PATENT DOCUMENTS

| DE | 44 24 287 C2 | 1/1996 |
|---|---|---|
| EP | 0 403 576 B1 | 12/1990 |

\* cited by examiner

*Primary Examiner*—Emmanuel M Marcelo
(74) *Attorney, Agent, or Firm*—Thomas R. Vigil

(57) ABSTRACT

The subject matter of the invention is a device and a method for storing a traction chain, more specifically a self-bracing traction chain. Such a device and such a method for storing the traction chain so that is occupies very little space are provided by having the traction chain (10) would into a plurality of side-by-side turns (14) about a winding apparatus (12) carried so as to be rotatable about its longitudinal axis.

13 Claims, 3 Drawing Sheets

METHOD AND DEVICE FOR STORING A TRACTION CHAIN

CROSS-REFERENCE TO RELATED APPLICATIONS

This application claims Priority from German Application No. DE 20 2004 006 624.6 filed on 26 Apr. 2004

BACKGROUND OF THE INVENTION

1. Field of the Invention

The present invention relates to a method of storing a self-bracing traction chain.

2. Description of the Prior Art

In systems for transporting persons or items, traction chains are often utilized to exactly and reliably move the actual transport platform from A to B. They may for example be lifts for persons or loads or feeding machines for feeding objects to processing plants or evacuating them therefrom, said processing plants being for example freeze drying facilities or coating furnaces. It is thereby known from the document DE 44 24 287 C2 or from EP 0 403 576 B1 to store the traction chains before, behind or beneath the actual drive wheel. Because, as a rule, such a traction chain can only be deviated in one direction, it is often stored beneath the drive wheel to form a half loop as can be seen from FIG. 7 of DE 44 24 287 C2. However, storing the traction chain in this manner requires a large amount of space so that the entire system will be very large as a result thereof.

BRIEF SUMMARY OF THE INVENTION

In view thereof, it is the object of the present invention to provide a method and a device for storing a traction chain so that said traction chain occupies little space.

As a technical solution to this object, the present invention proposes a method of storing a self-bracing traction chain.

A method implemented according to this technical teaching and a device configured according to this technical teaching have the advantage that the traction chain can be stored in the region located next to the actual drive wheel by winding it about a winding apparatus. Usually, in the transport systems of concern, there is space beside the drive wheel as the discrete transport platforms have a corresponding width. By winding the traction chain, space is made available before, beneath or below the actual drive wheel so that the transport system can be of an accordingly smaller construction, which affords significant savings in space. This permits to save much space in charging devices for freeze drying facilities for example so that the overall need for additional space to accommodate the charging device together with the freeze drying facility in the factory hall is reduced.

It has been found out that it is advantageous to configure the traction chain so that it is slidable across the direction of movement. This makes it possible to displace adjacent chain links so that discrete chain links are offset by slightly more than the width of the traction chain after one whole turn about the winding apparatus so that the traction chain can be wound into a plurality of turns about the winding apparatus.

In a preferred embodiment, the links of the traction chain are forced and guided by means of a restraint so as to become continuously offset. While the traction chain is wound about the winding apparatus, the links are caused to leave their aligned position and are offset by 1 mm to 5 mm, preferably by 3 mm, so that, after one turn, discrete chain links are offset by the width of the traction chain. When the traction chain is unwound from the winding apparatus, the discrete links are forced and guided by the restraint to be offset in the opposite direction so that the links, which had been offset by preferably 3 mm, are again aligned as soon as they leave the device for storing a traction chain. It is thus made certain that the traction chain forms one straight line while it engages the transport platform and that in the wound state the traction chain is oriented obliquely in order to achieve a plurality of turns about a winding apparatus.

In a preferred embodiment, the winding drum is configured to be a cylindrical hollow drum on the surface of which the traction chain comes to rest. The advantage thereof is that a large surface is provided for the traction chain to rest against. Another advantage is that the traction chain can be wound uniformly about the cylindrical surface of the drum, thus avoiding wedging.

In another preferred embodiment, the drum is mounted so as to be slidable across the direction of movement of the traction chain. The advantage thereof is that the drum can be caused to follow the movement while the traction chain is being wound and/or unwound in such a manner that the drum offers its free surface at every turn that is to be performed so that optimal winding of the traction chain may be achieved. It has thereby been found out that it is advantageous to guide the drum on a screw drive in order to achieve precise movement, thereby causing as little wear as possible to occur.

In still another preferred embodiment, there are provided recesses on the drum surface. These recesses mainly serve to clean the entire device, more specifically in order to meet the hygiene standards required in the food and/or pharmaceutical industry.

In another preferred embodiment, the links of the traction chain are slidable against each other on one side only. The advantage thereof is that the discrete links of the traction chain will not be inadvertently displaced in the wrong direction, which would result in incorrect winding. It has thereby been found advantageous to movably connect together adjacent links by means of a bolt, said bolt being guided by a pin provided on the first link and by a left and a right ridge provided on the second link. The left ridge is thereby configured to be thicker than the right ridge so that displacement is possible in one direction only.

In still another preferred embodiment, an outwardly protruding driver member that is preferably made from a plastic material (PE or PVDF) is mounted to each link of the traction chain. Said driver member engages corresponding mating parts provided on the transport platform to cause the latter to be driven forward. Concurrently, said driver member engages a restraint that forces and guides the adjacent links of the traction chain so that they become offset across the direction of movement. It has thereby been found advantageous to manufacture the driver member from PE or from PVDF so as to produce as little friction as possible in the restraint which is also made from PE or PVDF.

Further advantages of the method of the invention and of the device of the invention will become apparent in the appended drawings and in the following description of embodiments thereof. Likewise, the invention lies in each and every novel feature or combination of features mentioned above or described herein after. The embodiments discussed

DETAILED DESCRIPTION OF THE INVENTION

Figure 1:
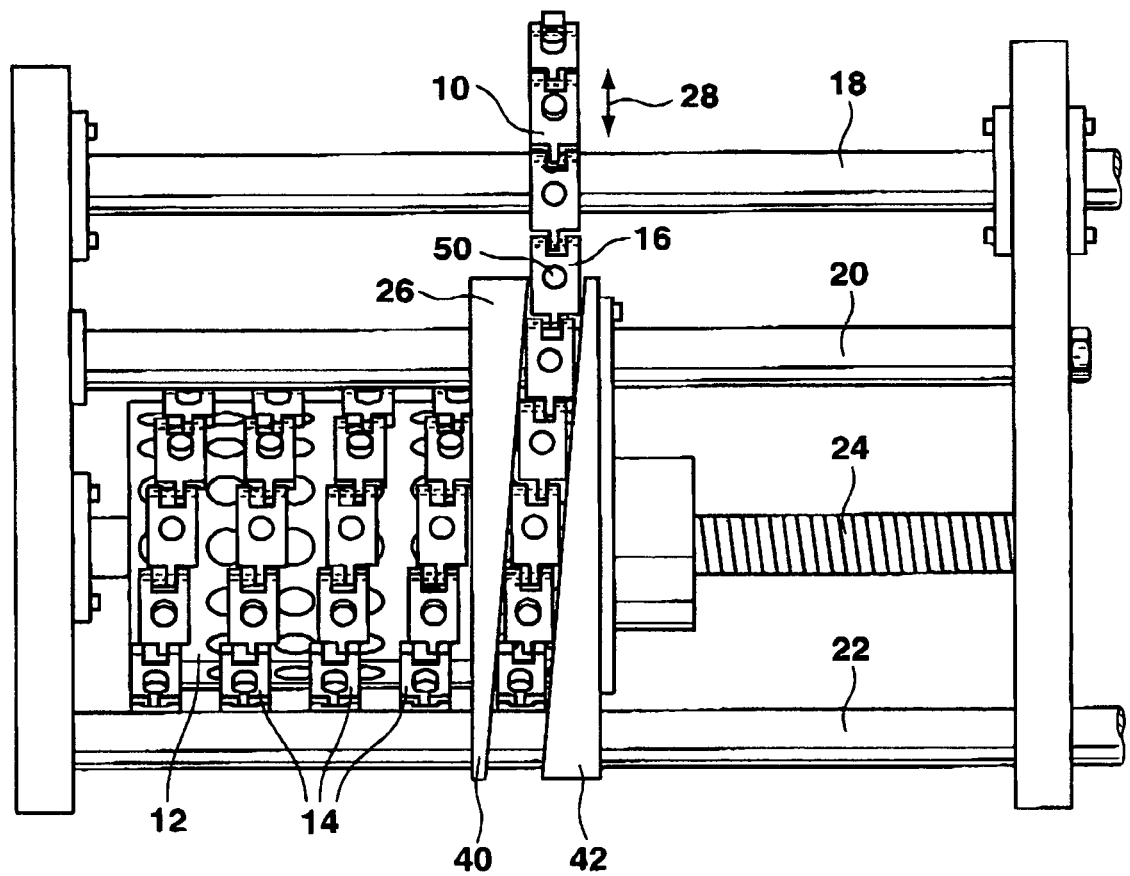
FIG. 1 is a view of the device of the invention with the traction chain being almost completely wound up.

In the systems for transporting persons or goods from A to B, traction chains 10 are often utilized to drive the transport platform (which has not been illustrated in closer detail herein). The traction chain 10 is thereby stored in a device for storing said traction chain 10. Said device includes a drum 12 about which the traction chain 10 is wound in a plurality of turns 14. The traction chain 10, which is composed of a plurality of links 16, is solidly fixed at its last link to the drum so that the traction chain 10 is prevented from becoming displaced on the drum 12.

The device for storing the traction chain 10 further includes a drive wheel that has not been illustrated in closer detail herein and that is rotatably carried on a shaft 18, as well as two retaining rods 20, 22, a screw drive 24 and a restraint 26 that has been configured of two parts here.

The drum 12 is carried on the screw drive 24 in such a manner that the drum 12 is movable pursuant to arrow 28 across the direction of movement of the traction chain 10. The drum 12 further comprises a number of recesses 30 allowing for easy cleaning of the drum 12.

Figure 3:
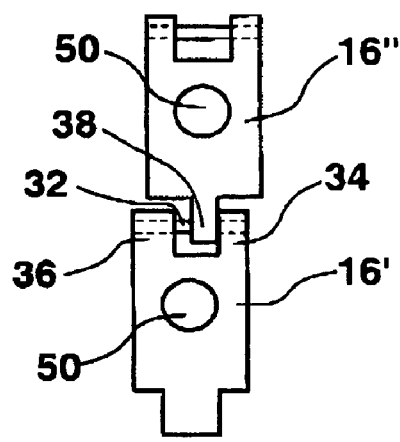
FIG. 3 shows two links of the traction chain of FIG. 1 in the offset position.
Figure 4:
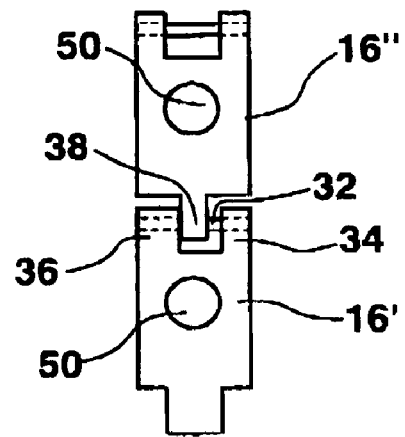
FIG. 4 shows two links of the traction chain of FIG. 1 in a rectilinear position.

The FIGS. 3 and 4 show two adjacent links 16' and 16". Said adjacent links 16' and 16" are articulated together by a bolt 32. In the first link 16' there is formed a right ridge 34 and a left ridge 36 in which the bolt 32 is retained, whereas a centrally disposed pin 38 through which the bolt 32 extends is integrally formed in the second link 16". The left ridge 36 is thereby configured to be much wider than the right ridge 34 so that the pin 38 rests exactly against the left ridge 36 provided the adjacent links 16' and 16" are aligned as shown in FIG. 4. By contrast, the pin 38 rests against the narrower right ridge 34 provided the adjacent links 16', 16" are offset relative to each other as shown in FIG. 3.

Figure 2:
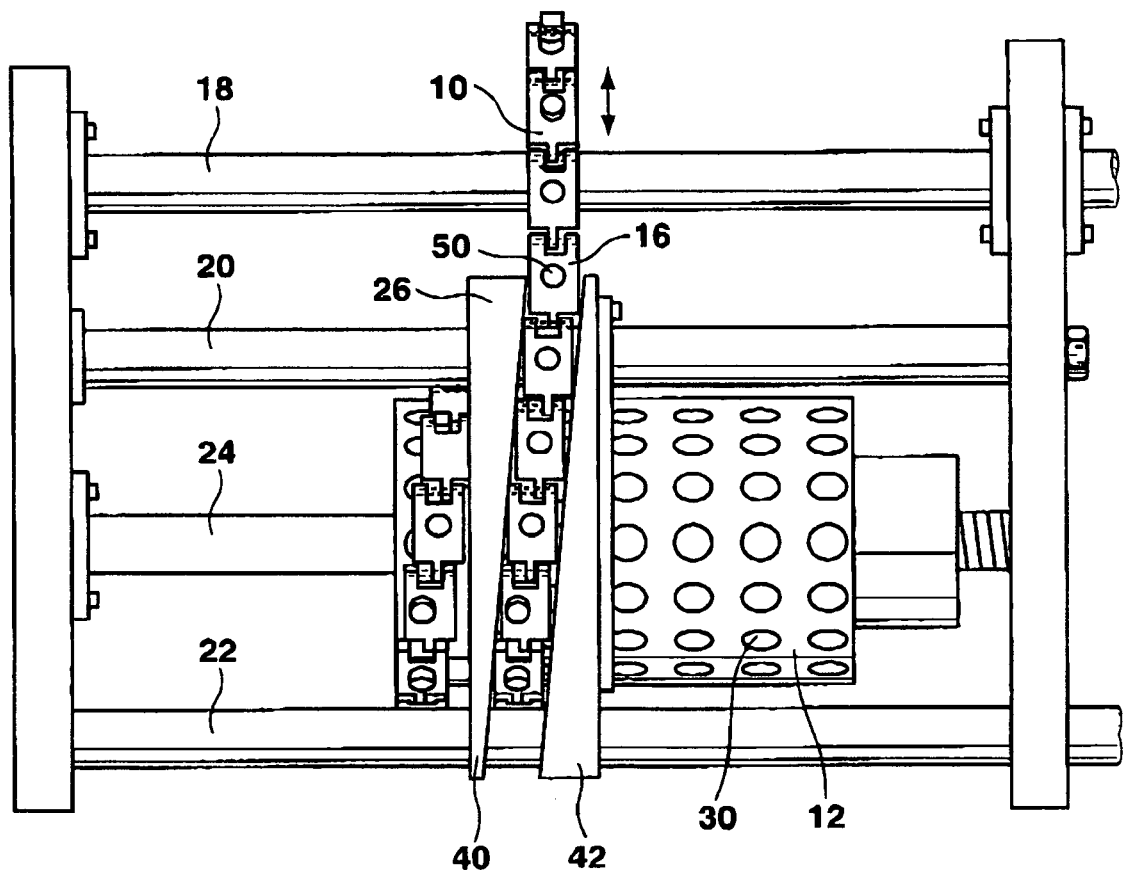
FIG. 2 is a view of the device of FIG. 1 with the traction chain being partially wound.

Reviewing now FIG. 2, imagine that the traction chain 10 is being wound about the drum 12; it is evident that the discrete links 16 of the traction chain 10 become offset with respect to their respective adjacent link 16 while resting against a first guiding edge 40. The links 16 become offset relative to each other in such a manner that when the chain is wound one complete turn, they become offset by slightly more than the width of the traction chain 10 so that a plurality of turns 14 can be wound next to each other about the drum 12. When the traction chain 10 is unwound from the drum 12, the links 16 are guided along a second guiding edge 42 and offset in such a manner that, when they leave the restraint 26, they are again aligned in a manner analogous to winding. It has thereby been found advantageous to manufacture the restraint 26, more specifically the guiding edges 40, 42, from PE in order to keep the frictional resistance low.

Figure 5:
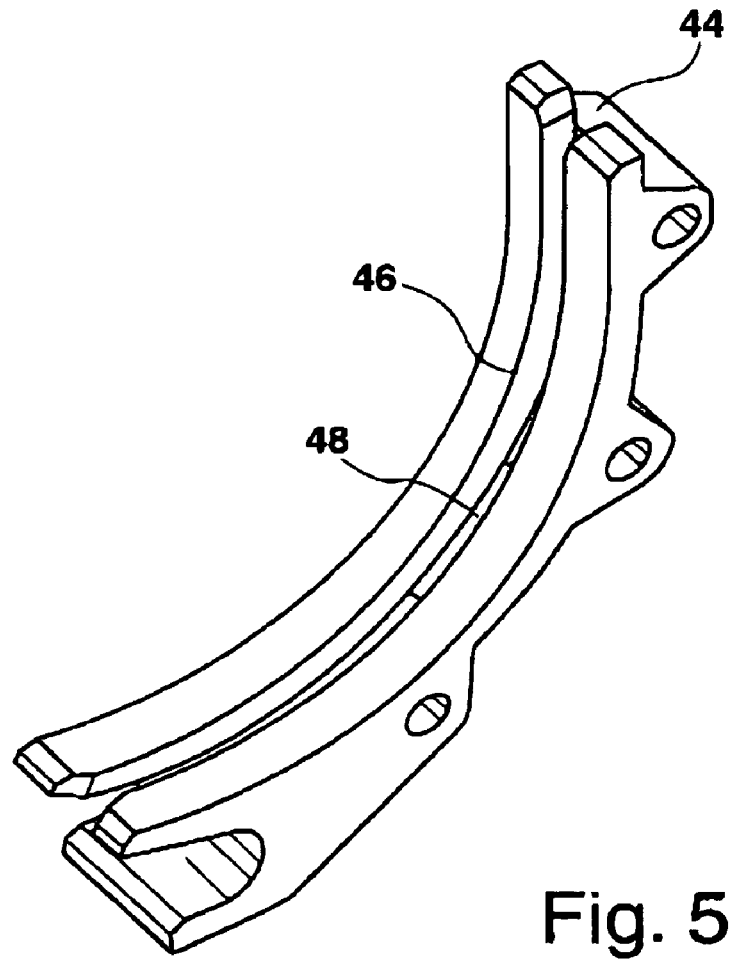
FIG. 5 is a perspective view of a restraint of the device of FIG. 1.

FIG. 5 illustrates an alternative restraint 44 that also comprises a first and a second guiding edge 46, 48 and that is also disposed at such an incline that the discrete links 16 of the traction chain 10 become offset by exactly one width of the traction chain 10 as they are passed once through the restraint 44. Since a number of links 16 are wound into one turn 14 about the drum 12, an offset of between 1 mm and 5 mm, preferably of 3 mm, is sufficient when the adjacent links 16', 16" have a width of about 30 mm. The restraint 44 is thereby designed in such a manner that the distance between the first guiding edge 46 and the second guiding edge 48 is chosen to allow a driver member 50 mounted to the link 16 to be positively guided. It has been found advantageous to manufacture both the driver member 50 and the restraint 26, 44 from PE in order to achieve as little friction as possible there.

It is understood that the exact dimensions of the discrete component parts are matched together. The offset between adjacent links 16 and, associated therewith, the restraint 26, 44, are for example designed in such a manner that in one turn 14 a complete offset by slightly more than the width of the traction chain occurs. Also, the pitch of the screw drive 24 is chosen to allow correct winding and unwinding of the traction chain 10 onto and from the drum 12 to be achieved.

In another embodiment that has not been illustrated herein, two devices for storing a traction chain of the type mentioned herein above are provided in one charging system, with the two drums being guided on the same screw drive.

Listing of Numerals 10 traction chain
12 drum
14 turn
16 link
18 shaft
20 retaining rod
22 retaining rod
24 screw drive
26 restraint
28 arrow
30 recess
32 bolt
34 right ridge
36 left ridge
38 pin
40 guiding edge
42 guiding edge
44 restraint
46 guiding edge
48 guiding edge
50 driver member

We claim:

1. A method for storing a self-bracing traction chain, characterized in that the traction chain (10) is wound into a plurality of side-by-side turns (14) about a winding apparatus (12) that is carried so as to be rotatable about its longitudinal axis and in that adjacent links (16) of the traction chain (10) are wound so as to become offset relative to each other across the direction of movement (28) when the traction chain (10) is wound and/or unwound.

2. The method according to claim 1, characterized in that the links (16) become continuously offset in a restraint (26, 44).

3. A device for storing a self-bracing traction chain, characterized by a winding apparatus (12) that is carried so as to be rotatable about its longitudinal axis for winding the traction chain (10) into a plurality of turns disposed side by side and
in that a drum (12) is carried so as to be slidable across the direction of movement (28) of the traction chain (10).

4. The device according to claim 3, characterized in that the winding apparatus is configured to be a cylindrical hollow drum (12) on the surface of which the traction chain (10) comes to rest.

5. The device according to claim 3, characterized by a restraint (26, 44) that causes adjacent links (16) to become offset across the direction of movement (28).

6. A device for storing a self-bracing traction chain, characterized by a winding apparatus (12) that is carried so as to be rotatable about its longitudinal axis for winding the traction chain (10) into a plurality of turns disposed side by side and in that a drum (12) is guided on a screw drive (24).

7. A device for storing a self-bracing traction chain, characterized by a winding apparatus (12) that is carried so as to be rotatable about its longitudinal axis for winding the traction chain (10) into a plurality of turns disposed side by side and in that recesses (30) are provided in the surface of a drum (12).

8. A device for storing a self-bracing traction chain, characterized by a winding apparatus (12) that is carried so as to be rotatable about its longitudinal axis for winding the traction chain (10) into a plurality of turns disposed side by side and in that adjacent links (16) of the traction chain (10) are connected together so as to be slidable against each other across the direction of movement (28).

9. The method according to claim 8, characterized in that the links (16) are slidable on one side only.

10. The device according to claim 8, characterized in that adjacent links (16', 16") are movably connected together by means of a bolt (32), said bolt (32) being retained at a first link (16") in a centrally disposed pin (38) whilst said bolt (32) is retained in a second link (16') in a right (34) and a left ridge (36) with the left ridge (36) being configured to be much thicker than the right ridge (34).

11. The device according to claim 8, characterized in that each link (16) comprises an outwardly protruding driver member (50).

12. The device according to claim 8, characterized by a restraint (26, 44) that causes the adjacent links (16) to become offset across the direction of movement (28).

13. The device according to claim 12, characterized in that the links (16) engage the restraint (26, 44) by their driver member (50) and are caused to become offset across the direction of movement (28) of the traction chain (10) by said driver member (50).

* * * * *

UNITED STATES PATENT AND TRADEMARK OFFICE
CERTIFICATE OF CORRECTION

| | | |
|---|---|---|
| PATENT NO. | : 7,621,508 B2 | Page 1 of 1 |
| APPLICATION NO. | : 11/113687 | |
| DATED | : November 24, 2009 | |
| INVENTOR(S) | : Alexander Wagner and Ralf Battenberg | |

It is certified that error appears in the above-identified patent and that said Letters Patent is hereby corrected as shown below:

Title Page
Please change:

"(73) Assignee: Motus Engineering GmbH & Co. KG, Fronhausen, (DE)"

To: --Accurro GmbH, Fronhausen, (DE)--.

Signed and Sealed this
Third Day of May, 2011

David J. Kappos
*Director of the United States Patent and Trademark Office*